US012294240B2

(12) United States Patent
Shimizu et al.

(10) Patent No.: US 12,294,240 B2
(45) Date of Patent: May 6, 2025

(54) MOTOR

(71) Applicant: DAIKIN INDUSTRIES, LTD., Osaka (JP)

(72) Inventors: Shunsuke Shimizu, Osaka (JP); Masaki Hirano, Osaka (JP); Hiroshi Hibino, Osaka (JP); Yoshitaka Okuyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 262 days.

(21) Appl. No.: 18/120,846

(22) Filed: Mar. 13, 2023

(65) Prior Publication Data

US 2023/0223799 A1 Jul. 13, 2023

Related U.S. Application Data

(63) Continuation of application No. PCT/JP2021/033556, filed on Sep. 13, 2021.

(30) Foreign Application Priority Data

Sep. 30, 2020 (JP) .................................. 2020-165213

(51) Int. Cl.
*H02K 1/14* (2006.01)
*H02K 1/16* (2006.01)

(52) U.S. Cl.
CPC .............. *H02K 1/146* (2013.01); *H02K 1/16* (2013.01)

(58) Field of Classification Search
CPC ............. H02K 1/14; H02K 1/146; H02K 1/16
(Continued)

(56) References Cited

U.S. PATENT DOCUMENTS 10,418,866 B2 * 9/2019 Hirotani ................... H02K 3/28
2007/0063610 A1 * 3/2007 Miyashita .............. H02K 29/03
310/216.057
(Continued)

FOREIGN PATENT DOCUMENTS

JP 6-70480 U 9/1994
JP 2000-166133 A 6/2000
(Continued)

OTHER PUBLICATIONS

International Preliminary Report of corresponding PCT Application No. PCT/JP2021/033556 dated Apr. 13, 2023.
(Continued)

*Primary Examiner* — Rashad H Johnson
(74) *Attorney, Agent, or Firm* — GLOBAL IP COUNSELORS, LLP

(57) ABSTRACT

A motor includes a rotor and stator. The stator includes a stator iron core having a substantially annular yoke, and a plurality of teeth extending from the yoke toward the rotor. Each tooth includes an extending portion with a winding wire wound in a concentrated manner to form a coil, and flange portions extending circumferentially from a tip end portion of the extending portion. The plurality of teeth include adjacent first second teeth with coils having identical phases, and adjacent third and fourth teeth with coils having different phases. A first magnetic resistance circumferentially from a tip end portion of the first flange portion to a center of the extending portion of the first tooth is higher than a second magnetic resistance circumferentially from a tip end portion of the second flange portion to a center of the extending portion of the third tooth.

11 Claims, 7 Drawing Sheets

(58) Field of Classification Search
USPC .................................................. 310/216.004
See application file for complete search history.

(56) References Cited

U.S. PATENT DOCUMENTS

| | | |
|---|---|---|
| 2008/0073995 A1 | 3/2008 | Niguchi et al. |
| 2014/0145547 A1* | 5/2014 | Nakano .................. H02K 1/165 |
| | | 310/216.069 |
| 2019/0081519 A1 | 3/2019 | Baba et al. |

FOREIGN PATENT DOCUMENTS

| | | |
|---|---|---|
| JP | 2008-86064 A | 4/2008 |
| JP | 2008-289209 A | 11/2008 |
| JP | 2013-207804 A | 10/2013 |
| JP | 2016-129450 A | 7/2016 |
| WO | 2017/208290 A1 | 12/2017 |
| WO | 2018/138866 A1 | 8/2018 |

OTHER PUBLICATIONS

European Search Report of corresponding EP Application No. 21 87 5166.7 dated Aug. 8, 2024.
International Search Report of corresponding PCT Application No. PCT/JP2021/033556 dated Oct. 19, 2021.

* cited by examiner

MOTOR

CROSS-REFERENCE TO RELATED APPLICATIONS

This is a continuation of International Application No. PCT/JP2021/033556 filed on Sep. 13, 2021, which claims priority to Japanese Patent Application No. 2020-165213, filed on Sep. 30, 2020. The entire disclosures of these applications are incorporated by reference herein.

BACKGROUND

Technical Field

The present disclosure relates to a motor.

Background Art

Conventionally, a stator has been known, which is in such a form that sets of coils having the same phase and sets of coils having the different phases are alternately wound around teeth adjacent to each other in a circumferential direction. A stator of this type is described, for example, in Japanese Unexamined Patent Publication No. 2008-86064. The stator described in Japanese Unexamined Patent Publication No. 2008-86064 includes a plurality of tooth portions having the same size and arranged at equal intervals along a circumferential direction so as to extend toward a rotor, and a circular ring-shaped yoke portion to which the plurality of tooth portions is coupled. In an embodiment described in Japanese Unexamined Patent Publication No. 2008-86064, twelve tooth portions are provided, and windings are wound around the tooth portions. These windings are suitably connected to a three-phase power source such that each set of four windings is supplied with a U-phase, V-phase, or W-phase power. Thus, in the stator disclosed in Japanese Unexamined Patent Publication No. 2008-86064, sets of coils having the same phase and sets of coils having the different phases are alternately wound around the teeth adjacent to each other in the circumferential direction.

SUMMARY

A first aspect of the present disclose is directed to a motor including a rotor rotatable about a shaft, and a stator arranged so as to face the rotor in a radial direction. The stator includes a stator iron core includes a yoke that is substantially annular, and a plurality of teeth extending from the yoke toward the rotor in the radial direction and being arranged at intervals in a circumferential direction of the yoke. Each of the plurality of teeth include an extending portion around which a winding wire is wound in a concentrated manner to form a coil, and flange portions extending in both ways in the circumferential direction from a tip end portion of the extending portion in the radial direction. The plurality of teeth include a first tooth, a second tooth adjacent to the first tooth in the circumferential direction and around which a coil having a phase identical to a coil wound around the first tooth is wound, a third tooth, and a fourth tooth adjacent to the third tooth in the circumferential direction and around which a coil having a phase different from a coil wound around the third tooth is wound. The flange portions each including a first flange portion of the first tooth extending toward the second tooth, and a second flange portion of the third tooth extending toward the fourth tooth. A level of a magnetic resistance from a tip end portion of the first flange portion in the circumferential direction to a center of the extending portion of the first tooth in the circumferential direction is a first magnetic resistance. A level of a magnetic resistance from a tip end portion of the second flange portion in the circumferential direction to a center of the extending portion of the third tooth in the circumferential direction is a second magnetic resistance. The second magnetic resistance is lower than the first magnetic resistance.

DETAILED DESCRIPTION OF EMBODIMENT(S)

Embodiments of the present disclosure will be described below with reference to the drawings. The following embodiments are merely preferred examples in nature, and are not intended to limit the scope, applications, or use of the present disclosure.

EMBODIMENTS

First Embodiment

General Configuration of Motor

Figure 1:
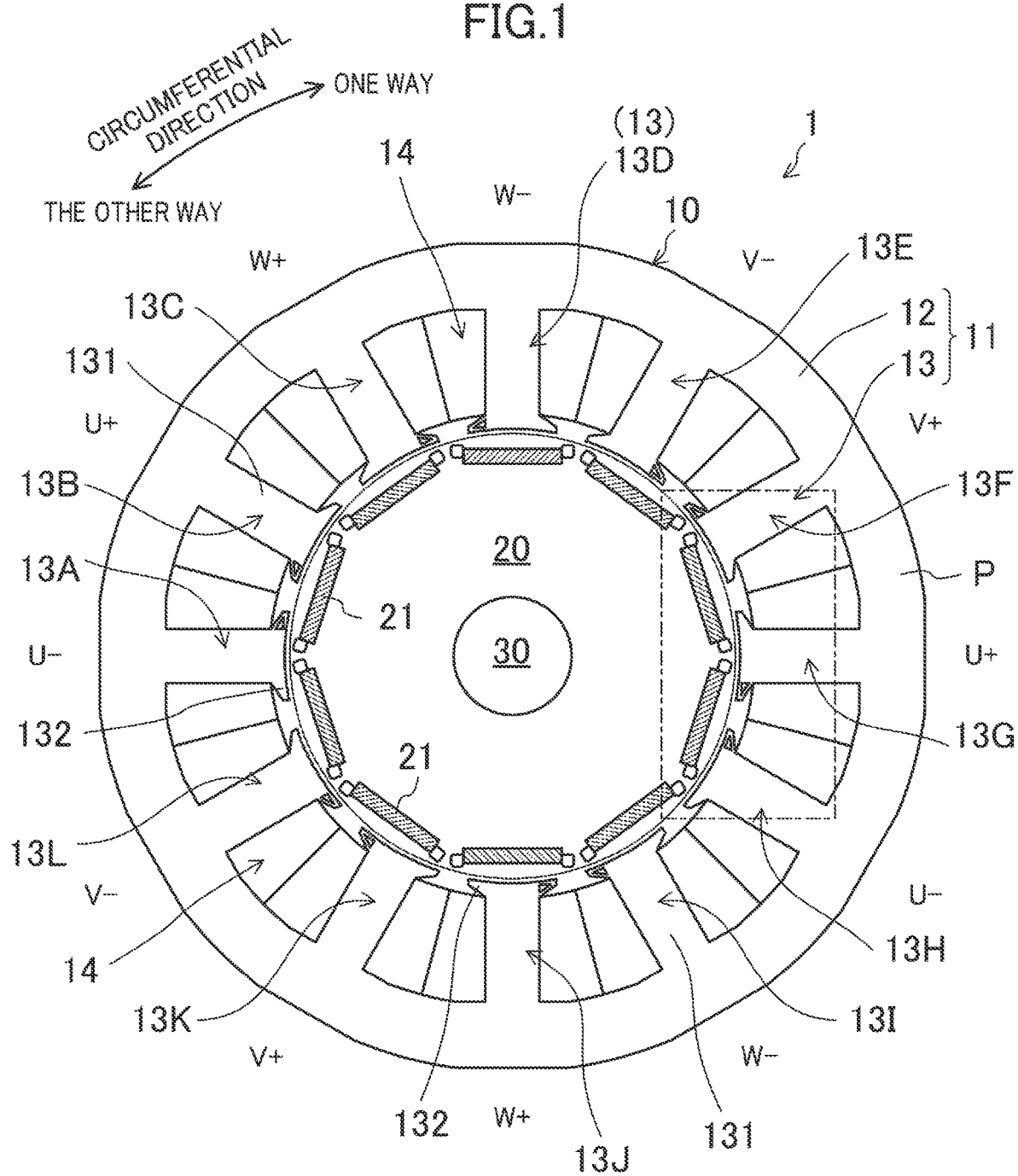
FIG. 1 is a cross-sectional view of a motor according to a first embodiment of the present disclosure, taken along a direction perpendicular to an axial direction.

A configuration of a motor (1) according to this embodiment will be described below with reference to FIG. 1. FIG. 1 is a cross-sectional view of the motor (1) according to this embodiment, taken along a direction perpendicular to an axial direction. The motor (1) is incorporated into, for example, a compressor of an air conditioner. As illustrated in FIG. 1, the motor (1) includes a stator (10), a rotor (20), and a shaft (30).

In the following description, a direction along the axis of the shaft (30) may be referred to as an "axial direction," a direction along a circle about the shaft (30) may be referred to as a "circumferential direction," and a direction perpendicular to the axis of the shaft (30) may be referred to as a "radial direction."

The shaft (30) is in a columnar shape, and extends in the axial direction. The shaft (30) is connected to a target to be supplied with a power. The rotor (20) is rotatable about the shaft (30). The stator (10) is arranged so as to face the rotor (20) in the radial direction.

The stator (10) of this embodiment is arranged nearer to the outer periphery of the motor (1), and is fixed to a housing (not shown). The stator (10) includes a stator iron core (11) and windings (not shown).

The stator iron core (11) includes a plurality of electrical steel sheets (P), which are laminated sheets, laminated in the axial direction. The stator iron core (11) of this embodiment includes a yoke (12) having a substantially annular shape, more specifically a substantially circular ring shape, as viewed in the axial direction. The stator iron core (11) includes a plurality of teeth (13) extending radially inward (toward the rotor (20) described later) from an inner peripheral surface of the yoke (12). The plurality of teeth (13) is arranged at substantially equal intervals in the circumferential direction of the yoke (12).

Each of the plurality of teeth (13) includes an extending portion (131) and flange portions (132). The extending portion (131) extends linearly radially inward from the inner peripheral surface of the yoke (12). A winding is wound around each tooth (13) in a concentrated manner to form a coil (14). The flange portions (132) extend in both ways in the circumferential direction from a tip end portion of the extending portion (131) on the inside in the radial direction. The flange portions (132) press the coil (14) wound around the extending portion (131).

As illustrated in FIG. 1, twelve teeth (13) are provided in total in this embodiment. Each winding is wound around a corresponding one of the teeth (13), and when a predetermined current flows in these windings, the stator (10) is brought into a state in which the stator (10) has ten poles in the circumferential direction.

More specifically, the windings are connected to a three-phase power source (not shown) such that three sets of four windings are supplied with a U-phase, V-phase, and W-phase power, respectively. The three-phase power source outputs pulse width modulated signals which are voltage signals respectively corresponding to the phases and being modulated in pulse width, thereby controlling rotation of the motor (1), for example.

More specifically, as illustrated in FIG. 1, the following arrangement pattern is employed: two coils to be supplied with the U-phase power are arranged subsequently in the circumferential direction; from these coils as viewed in the figure, two coils to be supplied with the W-phase power are arranged subsequently in one way of the circumferential direction, two coils to be supplied with the V-phase power are arranged subsequently in the one way of the circumferential direction, two coils to be supplied with the U-phase power are arranged subsequently in the one way of the circumferential direction, two coils to be supplied with the W-phase power are arranged subsequently in the one way of the circumferential direction, and two coils to be supplied with the V-phase power are arranged subsequently in the one way of the circumferential direction; and the first-described coils supplied with the U-phase power are, in the one way of the circumferential direction, subsequent to the last-described coils supplied with the V-phase power.

Ten permanent magnets (21) are embedded at equal intervals in the circumferential direction in an outer peripheral portion of the rotor (20). Thus, the rotor (20) is in a state in which the rotor (20) has ten poles in the circumferential direction. As the permanent magnet (21), various well-known permanent magnets may be employed, and, for example, a neodymium magnet may be employed. The permanent magnets (21) are arranged such that the N poles and the S poles are alternately arranged in the circumferential direction.

As described above, the motor (1) of this embodiment is a 10-pole 12-slot motor, and as compared to a general motor configured such that the ratio of the number of poles to the number of slots is 2:3, a winding factor can be improved and an interlinkage magnetic flux of the permanent magnet (21) of the motor (1) can be effectively utilized.

In the following description, it is assumed that a correspondence relationship among the twelve teeth (13A to 13L) and the phases of the coils (14) is as shown in FIG. 1.

Detailed Configuration of Teeth

All of the twelve teeth (13A to 13L) have the same outer shape as viewed in the axial direction. Each of the teeth (13A to 13L) has an outer shape symmetrical with respect to the center line of the tooth in a width direction thereof, as viewed in the axial direction.

In the case of focusing on the tooth (13G), the tooth (13H) is adjacent to the tooth (13G) in the circumferential direction. The coil (U−) having the same phase as that of the coil (U+) wound around the tooth (13G) is wound around the tooth (13H). That is, when the tooth (13G) is defined as a "first tooth" according to this embodiment, the tooth (13H) can be defined as a "second tooth."

The same relationship between the "first tooth" and the "second tooth" can also be applied to a relationship between the tooth (13I) and the tooth (13J), a relationship between the tooth (13K) and the tooth (13L), a relationship between the tooth (13A) and the tooth (13B), a relationship between the tooth (13C) and the tooth (13D), and a relationship between the tooth (13E) and the tooth (13F).

In the case of focusing on the tooth (13G), the tooth (13F) is adjacent to the tooth (13G) in the circumferential direction. The coil (V+) having a phase different from that of the coil (U+) wound around the tooth (13G) is wound around the tooth (13F). That is, when the tooth (13G) is defined as a "third tooth" according to this embodiment, the tooth (13F) can be defined as a "fourth tooth."

The same relationship between the "third tooth" and the "fourth tooth" can also be applied to a relationship between the tooth (13H) and the tooth (13I), a relationship between the tooth (13J) and the tooth (13K), a relationship between the tooth (13L) and the tooth (13A), a relationship between the tooth (13B) and the tooth (13C), and a relationship between the tooth (13D) and the tooth (13E).

Figure 2:
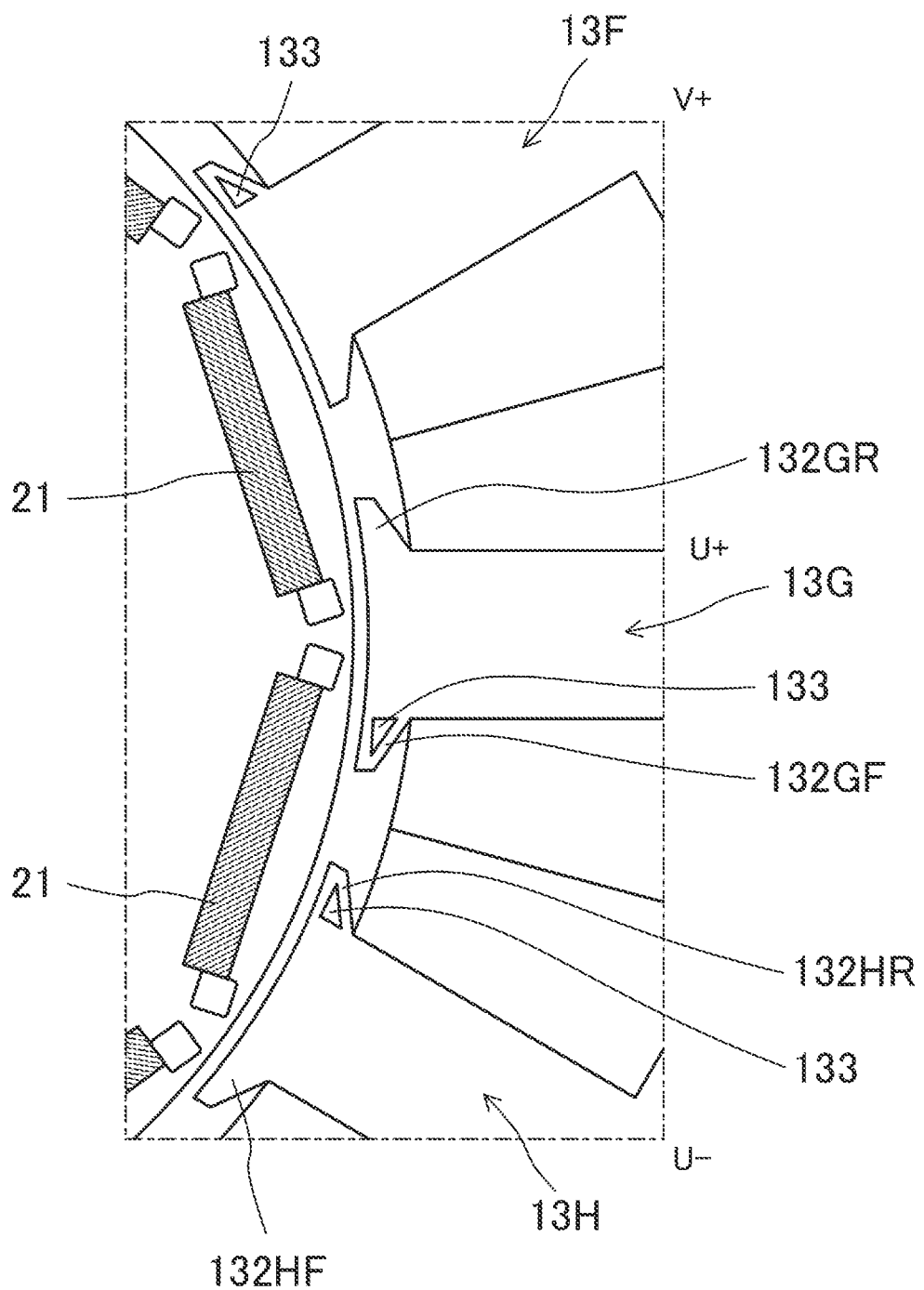
FIG. 2 is an enlarged view of part of FIG. 1.
Figure 3:
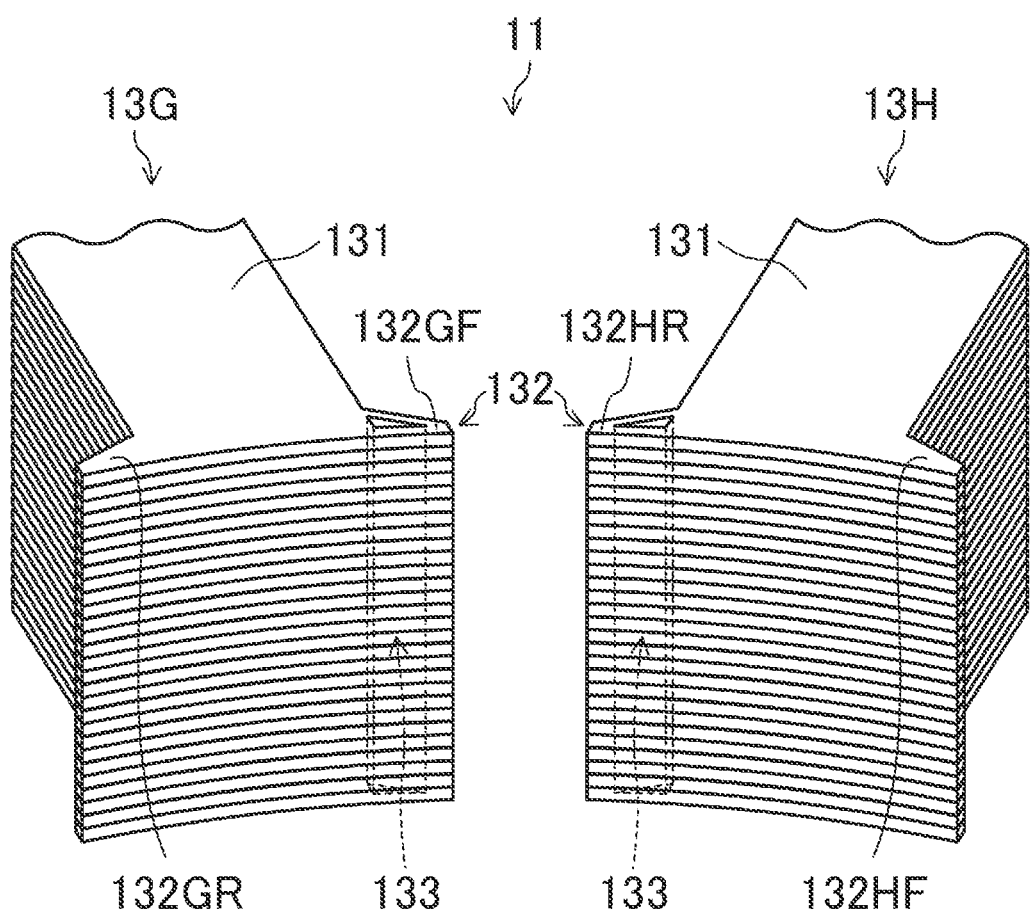
FIG. 3 is a perspective view partially illustrating adjacent teeth around which coils having the same phase are wound.

Of the flange portions (132) of the tooth (13G), a flange portion (132GF) extending in one way in the circumferential direction extends toward the adjacent coil (U−) having the same phase as that of the coil (U+) wound around the tooth (13G), as illustrated in FIG. 2. Thus, the flange portion (132GF) can be defined as a "first flange portion" according to this embodiment. In this embodiment, a hollow is provided in the flange portion (132GF) which is the first flange portion. More specifically, as illustrated in FIG. 3, a through hole (hole) (133) extending in the axial direction is provided in the flange portion (132GF).

Similarly, a flange portion (132HR) of the tooth (132H) on the other side in the circumferential direction, a flange portion (132) of the tooth (13I) on one side in the circumferential direction, a flange portion (132) of the tooth (13J) on the other side in the circumferential direction, a flange portion (132) of the tooth (13K) on one side in the circumferential direction, a flange portion (132) of the tooth (13L) on the other side in the circumferential direction, a flange portion (132) of the tooth (13A) on one side in the circumferential direction, a flange portion (132) of the tooth (13B) on the other side in the circumferential direction, a flange portion (132) of the tooth (13C) on one side in the circumferential direction, a flange portion (132) of the tooth (13D) on the other side in the circumferential direction, a flange portion (132) of the tooth (13E) on one side in the circumferential direction, and a flange portion (132FR) of the tooth (13F) on the other side in the circumferential direction can also be defined as "first flange portions" according to this embodiment. Through holes (holes) (133) extending in the axial direction are provided in these flange portions (132).

Of the flange portions (132) of the tooth (13G), a flange portion (132GR) on the other side in the circumferential direction extends toward the adjacent coil (V+) having a phase different from that of the coil (U+) wound around the tooth (13G). Thus, the flange portion (132GR) can be defined as a "second flange portion" according to this embodiment. In this embodiment, no hollow is provided in the flange portion (132GR) which is the second flange portion.

Similarly, a flange portion (132HF) of the tooth (132H) on one side in the circumferential direction, a flange portion (132) of the tooth (13I) on the other side in the circumferential direction, a flange portion (132) of the tooth (13J) on one side in the circumferential direction, a flange portion (132) of the tooth (13K) on the other side in the circumferential direction, a flange portion (132) of the tooth (13L) on one side in the circumferential direction, a flange portion (132) of the tooth (13A) on the other side in the circumferential direction, a flange portion (132) of the tooth (13B) on one side in the circumferential direction, a flange portion (132) of the tooth (13C) on the other side in the circumferential direction, a flange portion (132) of the tooth (13D) on one side in the circumferential direction, a flange portion (132) of the tooth (13E) on the other side in the circumferential direction, and a flange portion (132FF) of the tooth (13F) on one side in the circumferential direction can also be defined as "second flange portions" according to this embodiment. No hollow is provided in these flange portions (132).

According to the above-described configuration, in the motor (1) of this embodiment, a magnetic resistance is high between the adjacent teeth (13) around which the coils (14) having the same phase are wound. More specifically, the hollows are provided in the flange portions (132GF, 132HR) of the adjacent teeth (13G, 13H) around which the coils (14) having the same phase are wound, for example. The hollow is filled with fluid (e.g., air or refrigerant), and the fluid has a lower magnetic permeability than that of a material forming the stator iron core (11). Thus, a short-circuit of a magnetic flux is less likely to be caused between the adjacent teeth (13) around which the coils (14) having the same phase are wound, and therefore, a formation of a magnetic flux path, in which a magnetic flux circulates only in the stator iron core (11) can be suppressed. Consequently, an increase in an induction voltage can be suppressed, and an operation range can be expanded.

First Variation of First Embodiment

Figure 4:
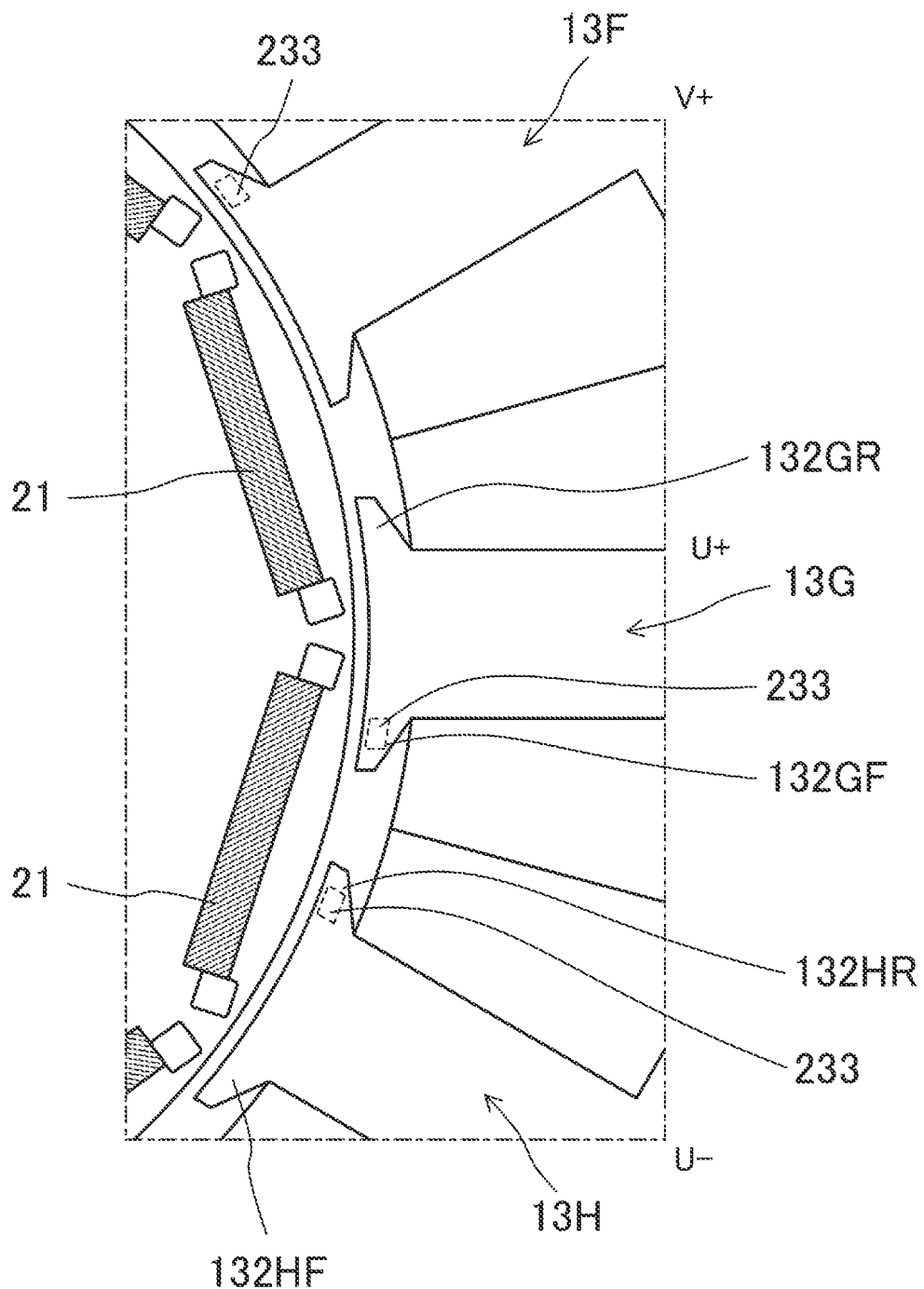
FIG. 4 is a partially-enlarged view of a plurality of adjacent teeth in a variation of the first embodiment.

A configuration of a motor (1) according to a first variation of the first embodiment will be described below with reference to FIG. 4. FIG. 4 is a partially-enlarged view of a plurality of adjacent teeth (13) in the first variation of the first embodiment.

A first flange portion of the tooth (13) according to this variation is different from that of the first embodiment in that the first flange portion includes a swaging portion (233) instead of the through hole (133). A flange portion (132GF), which is one example of the first flange portion, of a tooth (13G) on one side in the circumferential direction is provided with a swaging portion (233) for fastening of the plurality of laminated sheets (P), which form the stator iron core (11). Similarly, a flange portion (132HR), which is another example of the first flange portion, of a tooth (13H) on the other side in the circumferential direction is also provided with a swaging portion (233) for fastening of the plurality of laminated sheets (P), which form the stator iron core (11).

On the other hand, a flange portion (132GR), which is one example of a second flange portion, of the tooth (13G) on the other side in the circumferential direction is provided with no swaging portion. Similarly, a flange portion (132HF), which is another example of the second flange portion, of the tooth (13H) on one side in the circumferential direction is provided with no swaging portion.

Other first flange portions of the twelve teeth (13A to 13L) are also provided with swaging portions. No swaging portion is provided in any of other second flange portions of the twelve teeth (13A to 13L).

Generally, a compressive stress is applied to a portion at which the swaging portion is provided for fastening a plurality of laminated sheets (electrical steel sheets) forming an iron core, and, therefore an electrical resistance increases at the portion due to degradation of magnetic characteristics. In this variation, since the swaging portion (233) is provided in the first flange portion of the tooth (13), a formation of a short-circuit of a magnetic flux being caused between the adjacent teeth (13) around which coils (14) having the same phase are wound can be suppressed. Consequently, an increase in an induction voltage can be suppressed, and an operation range can be expanded.

Second Variation of First Embodiment

A configuration of a motor (1) according to a second variation of the first embodiment will be described below.

A first flange portion of a tooth (13) according to this variation is different from that of the first embodiment in that a through hole (133) is filled with a material having a lower magnetic permeability than that of a material forming a stator iron core (11). That is, the first flange portion of this embodiment contains a material having a lower magnetic permeability than that of a material forming a second flange portion.

According to the above-described configuration, in the motor (1) according to this variation, the level of the magnetic resistance of a portion of the tooth (13) near the first flange portion in a width direction of the tooth (13) can be higher, with a simple configuration, than the level of the magnetic resistance of a portion of the tooth (13) near the second flange portion in the width direction of the tooth (13) without changing the shapes of the first and second flange portions of the tooth (13).

Conventionally, in order to reduce a leakage magnetic flux, it has been proposed to configure the flange portions of teeth such that, on a side on which a coil wound around the tooth and a coil adjacent to the coil have the same phase, the length of protrusion of the flange portion in the circumferential direction is relatively shortener, and, on a side on which the coil wound around the tooth and a coil adjacent to the coil have different phases, the length of protrusion of the flange portion in the circumferential direction is relatively longer. However, when such a configuration is employed, the number of turns of the coil varies, the strength of the tooth is different between both ends of the tooth in the circumferential direction, and an area where the flange portion faces a permanent magnet of a rotor also varies.

In this regard, according to the motor (1) of this variation, the strength of the flange portions (132) of the tooth (13) can be ensured without varying the number of turns of the coil (14) while a formation of a short-circuit of a magnetic flux being caused between the adjacent teeth (13) around which the coils (14) having the same phase are wound is suppressed. Further, the area of the flange portions (132) facing the permanent magnet (21) of the rotor (20) does not vary, and the interlinkage magnetic flux of the permanent magnet (21) of the rotor (20) is not sacrificed.

Second Embodiment

Figure 5:
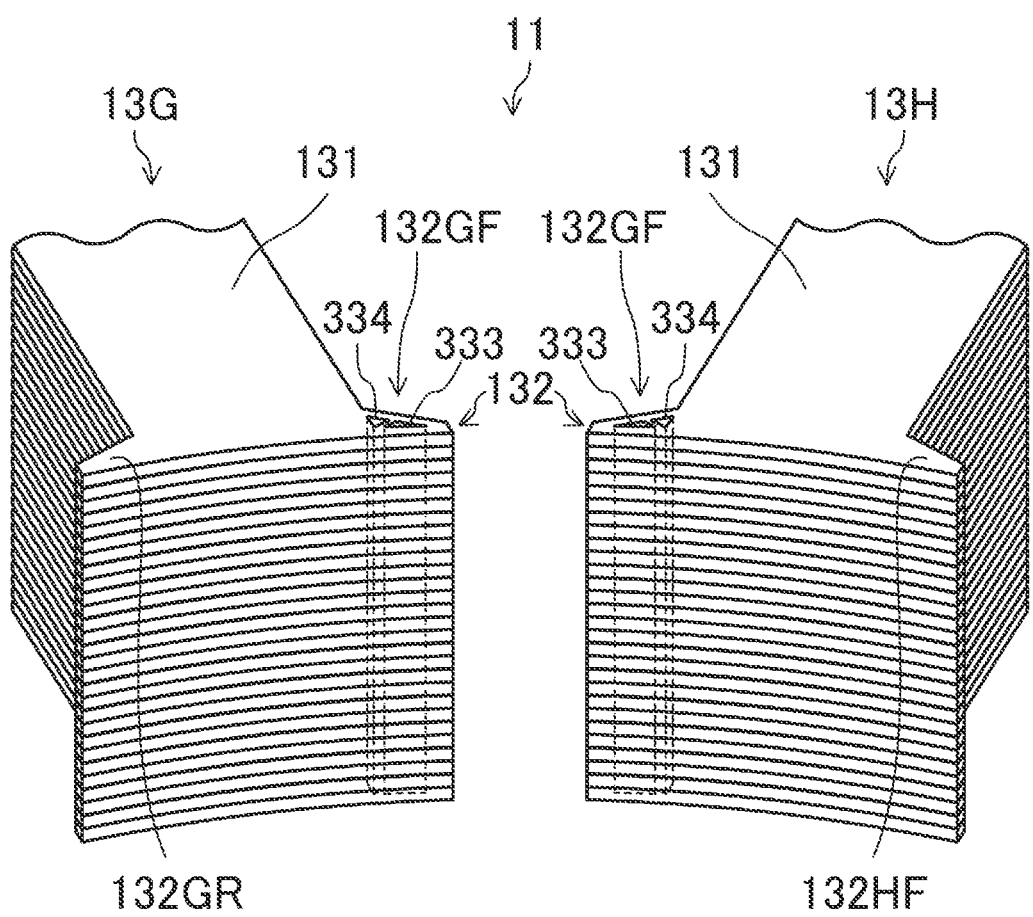
FIG. 5 is a perspective view partially illustrating adjacent teeth around which coils having the same phase are wound in a second embodiment.

A configuration of a motor (1) according to a second embodiment will be described below with reference to FIG. 5. FIG. 5 is a perspective view partially illustrating adjacent teeth (13) around which coils having the same phase are wound in the second embodiment.

Each first flange portion of the tooth (13) according to the second embodiment is different from that of the first embodiment in that the first flange portion has two through holes, i.e., a first through hole (333) and a second through hole (334), instead of one through hole (133). Any of the first through hole (333) and the second through hole (334) is a triangular hole as viewed in the axial direction. As viewed in the axial direction, the first through hole (333) and the second through hole (334) are arranged adjacent to each other with a rib therebetween.

In the second embodiment, the first through hole (333) and the second through hole (334) are laid out adjacent to each other with the rib therebetween, i.e., laid out to form a so-called truss structure, as described above, whereby the strength of flange portions (132) of the tooth (13) can be ensured. Thus, an effect of the flange portions (132) holding a coil (14) is not sacrificed. According to the configuration of the second embodiment as well, a short-circuit of a magnetic flux is less likely to be caused between the adjacent teeth (13) around which the coils (14) having the same phase are wound.

Third Embodiment

Figure 6:
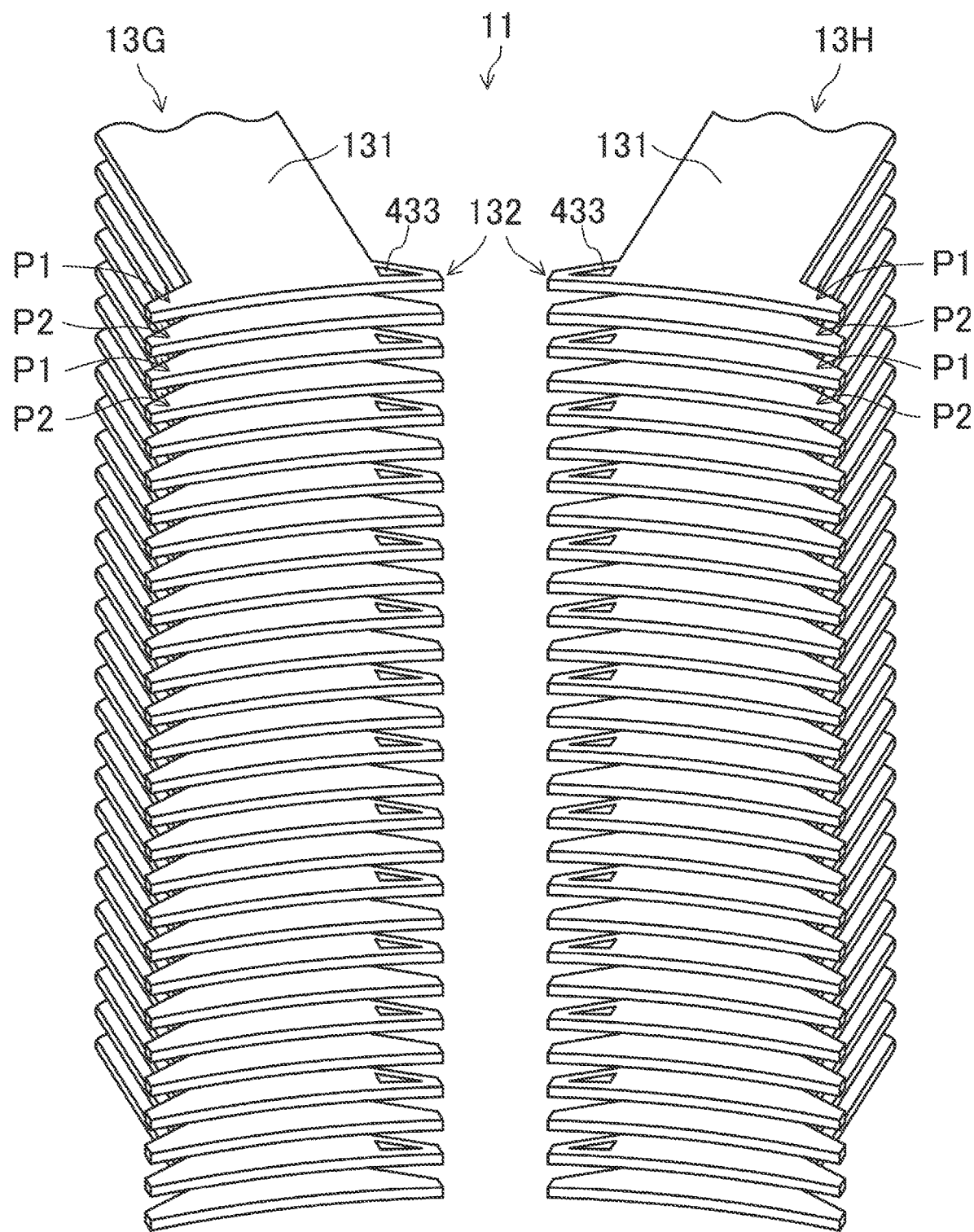
FIG. 6 is an exploded perspective view of adjacent teeth around which coils having the same phase are wound in a third embodiment.

A configuration of a motor (1) according to a third embodiment will be described below with reference to FIG. 6. FIG. 6 is an exploded perspective view of adjacent teeth (13) around which coils (14) having the same phase are wound in the third embodiment.

A stator iron core (11) of the third embodiment is different from that of the first embodiment in that the stator iron core (11) of the third embodiment includes plural types of electrical steel sheets (P) laminated alternately by a predetermined number. As illustrated in FIG. 6, the stator iron core (11) of the third embodiment includes first electrical steel sheets (P1) and second electrical steel sheets (P2).

The first electrical steel sheet (P1) includes a yoke (12) and teeth (13). A through hole (433) is provided in a first flange portion of the first electrical steel sheet (P1), whereas no through hole is formed in a second flange portion. The second electrical steel sheet (P2) includes a yoke (12) and teeth (13). A through hole is provided in neither a first flange portion of the second electrical steel sheet (P2) nor a second flange portion.

The first electrical steel sheets (P1) and the second electrical steel sheets (P2) are laminated alternately by the predetermined number. In this embodiment, the first electrical steel sheets (P1) and the second electrical steel sheets (P2) are laminated alternately one by one. The present disclosure is not limited to the above, and, for example, the first electrical steel sheets and the second electrical steel sheets may be laminated alternately two by two.

With the use of the stator iron core (11) configured as described above, the stator (10) can have desired characteristics in terms of a magnetic resistance level and a stiffness.

Fourth Embodiment

Figure 7:
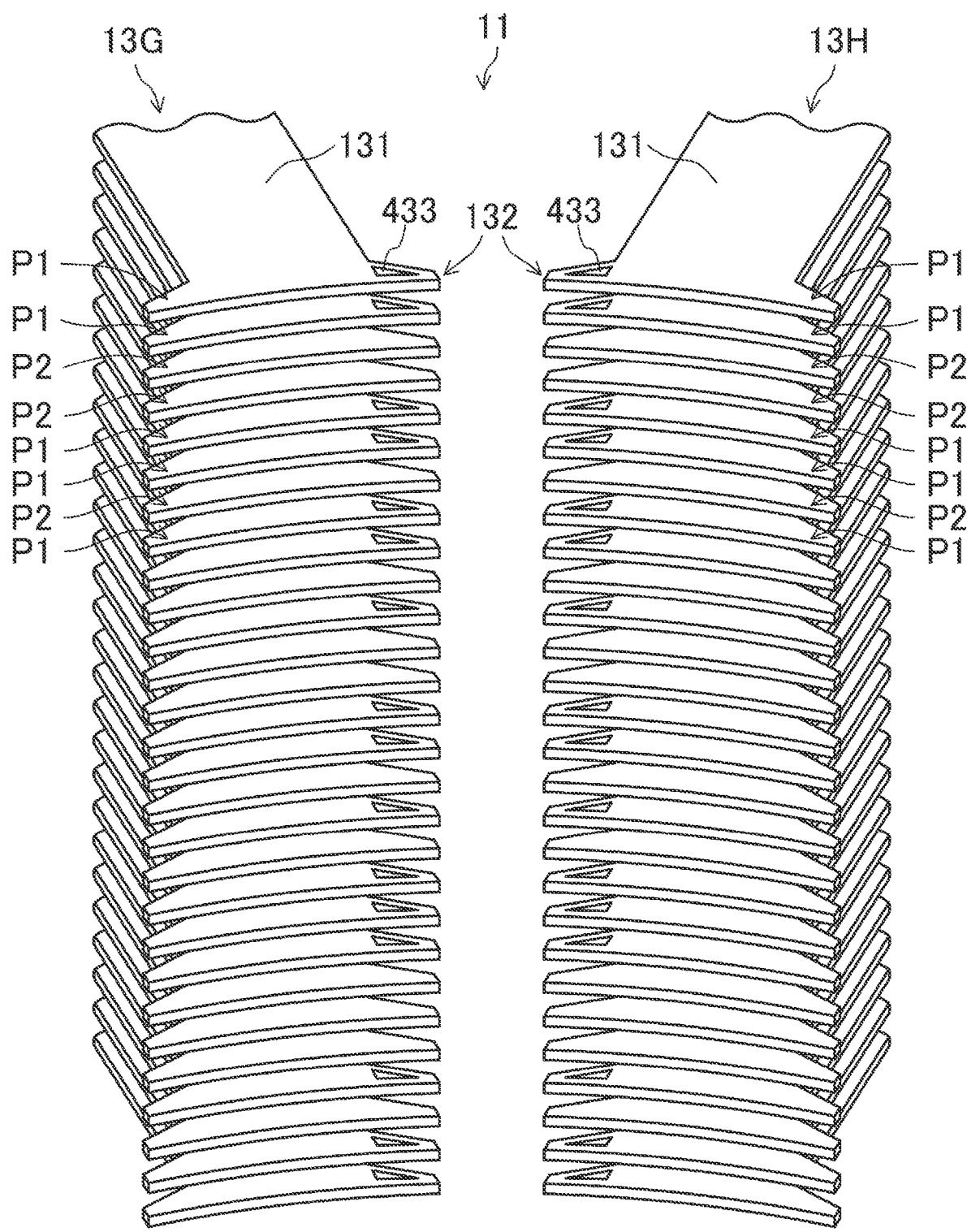
FIG. 7 is an exploded perspective view of adjacent teeth around which coils having the same phase are wound in a fourth embodiment.

A configuration of a motor (1) according to a fourth embodiment will be described below with reference to FIG. 7. FIG. 7 is an exploded perspective view of adjacent teeth (13) around which coils (14) having the same phase are wound in the fourth embodiment.

A stator iron core (11) of the fourth embodiment is different from that of the third embodiment in that first electrical steel sheets (P1) and second electrical steel sheets (P2) are laminated in a desired order. As illustrated in FIG. 7, the stator iron core (11) of the fourth embodiment includes, as in the third embodiment, the first electrical steel sheets (P1) and the second electrical steel sheets (P2).

The first electrical steel sheets (P1) and the second electrical steel sheets (P2) are laminated in an irregular order in the axial direction. In other words, the first electrical steel sheets (P1) and the second electrical steel sheets (P2) are laminated in an order desired by a manufacturer in the axial direction.

With the use of the stator iron core (11) configured as described above, the stator (10) can have, with a higher degree of freedom, desired characteristics in terms of a magnetic resistance level and a stiffness.

SUMMARY

As described above, the motors (1) according to the above-described embodiments are configured such that the level of the magnetic resistance from the tip end portion of the flange portion (132), which extends toward the second tooth (13H), of the first tooth (13G) in the circumferential direction to the center of the extending portion (131) of the first tooth (13G) in the circumferential direction is a first magnetic resistance (R1), and the level of the magnetic resistance from the tip end portion of the flange portion (132), which extends toward the fourth tooth (13F), of the third tooth (13G) in the circumferential direction to the center of the extending portion (131) of the third tooth (13G) in the circumferential direction is a second magnetic resistance (R2) lower than the first magnetic resistance (R1) (R1>R2). Thus, a short-circuit of a magnetic flux is less likely to be caused between the adjacent teeth (13) around which the coils (14) having the same phase are wound, and therefore, a formation of a magnetic flux path, in which a magnetic flux circulates only in the stator iron core (11) can be suppressed. Consequently, an increase in an induction voltage can be suppressed, and an operation range can be expanded.

As described above, in order to reduce a leakage magnetic flux, it has been conventionally proposed to configure the flange portions of the teeth such that, on a side on which a coil wound around the tooth and a coil adjacent to the coil have the same phase, the length of protrusion of the flange portion in the circumferential direction is relatively shortener, and, on a side on which the coil wound around the tooth and a coil adjacent to the coil have different phases, the length of protrusion of the flange portion in the circumferential direction is relatively longer. When such a configuration is employed, a space into which a nozzle for winding a winding is to be inserted is restricted by a narrower slot, and a winding holding effect of the flange portion is restricted by a wider slot. As a result, there is a great restriction on production and a productivity is thus degraded. On the other hand, the motors (1) according to the above-described embodiments are configured such that all the teeth (13) have the flange portions (132) having the same width and the extending portions (131) having the same width, and all the slots among the teeth (13) have the same shape and size. Thus, the windings can be wound around all the teeth (13) in the same manner, leading to improvement in the productivity.

Variations

While the exemplary embodiments of the present disclosure has been described above, the present disclosure is not limited to the embodiments.

The shape of the through hole provided in the first flange portion as viewed in the axial direction is not limited to the triangular shape. Instead of the above-described shape, the shape of the through hole as viewed in the axial direction may be a circular, rectangular, or elliptical shape.

The hollow provided in the first flange portion is not limited to the through hole. Instead of the above-described through hole, the first flange portion may be provided with a notch as a hollow.

Both the hollow and the swaging portion may be provided in the first flange portion.

The motors (1) of the above-described embodiments are configured such that the sets of coils (14) having the same phase and the sets of coils (14) having the different phases are alternately wound around the teeth (13) adjacent to each other in the circumferential direction, but the present disclosure is not limited to such a configuration. Instead of the above-described configuration, plural sets of coils (14) having the same phase may be continuously wound around the teeth (13) adjacent to each other in the circumferential direction. That is, the motor (1) is not limited to the 10-pole 12-slot motor. Instead of the above-described motors, the motor (1) may be an 8-pole 9-slot motor, a 10-pole 9-slot motor, or a 14-pole 12-slot motor, for example.

The motor (1) of the above-described embodiments are configured such that the stator is arranged on the outer peripheral side, and the rotor is arranged on the inner peripheral side. Instead of the above-described configuration, the motor may be of a so-called outer rotor type in which a rotor is arranged on the outer peripheral side and a stator is arranged on the inner peripheral side.

The elements described in the above embodiments and variations may be combined as appropriate, as long as any contradictions will not occur.

The present disclosure is usefully applicable to a motor.

The invention claimed is:

1. A motor comprising:
a rotor rotatable about a shaft; and
a stator arranged so as to face the rotor in a radial direction, the stator including a stator iron core,
the stator iron core including
a yoke that is substantially annular, and
a plurality of teeth extending from the yoke toward the rotor in the radial direction and being arranged at intervals in a circumferential direction of the yoke,
each of the plurality of teeth including
an extending portion around which a winding wire is wound in a concentrated manner to form a coil, and
flange portions extending in both ways in the circumferential direction from a tip end portion of the extending portion in the radial direction,
the plurality of teeth including
a first tooth,
a second tooth adjacent to the first tooth in the circumferential direction and around which a coil having a phase identical to a coil wound around the first tooth is wound,
a third tooth, and
a fourth tooth adjacent to the third tooth in the circumferential direction and around which a coil having a phase different from a coil wound around the third tooth is wound,
the flange portions each including
a first flange portion of the first tooth extending toward the second tooth, and
a second flange portion of the third tooth extending toward the fourth tooth,
a level of a magnetic resistance from a tip end portion of the first flange portion in the circumferential direction to a center of the extending portion of the first tooth in the circumferential direction being a first magnetic resistance,
a level of a magnetic resistance from a tip end portion of the second flange portion in the circumferential direction to a center of the extending portion of the third tooth in the circumferential direction being a second magnetic resistance, and
the second magnetic resistance being lower than the first magnetic resistance.

2. The motor of claim 1, wherein
the first flange portion has a hollow, and the second flange portion has no hollow.

3. The motor of claim 2, wherein
the hollow of the first flange portion includes a plurality of holes.

4. The motor of claim 3, wherein
the stator iron core includes a plurality of laminated sheets, and
the first flange portion includes a swaging portion usable to fasten the plurality of laminated sheets.

5. The motor of claim 2, wherein
the stator iron core includes a plurality of laminated sheets, and
the first flange portion includes a swaging portion usable to fasten the plurality of laminated sheets.

6. The motor of claim 1, wherein
the first flange portion contains a material having a lower magnetic permeability than a material forming the second flange portion.

7. The motor of claim 6, wherein
the stator iron core includes a plurality of laminated sheets, and
the first flange portion includes a swaging portion usable to fasten the plurality of laminated sheets.

8. The motor of claim 1, wherein
the stator iron core includes a plurality of laminated sheets, and
the first flange portion includes a swaging portion usable to fasten the plurality of laminated sheets.

9. The motor of claim 1, wherein
the stator iron core includes a plurality of laminated sheets, and the plurality of laminated sheets includes
a first laminated sheet in which a level of the magnetic resistance of the first flange portion is lower than a level of the magnetic resistance of the second flange portion, and
a second laminated sheet in which there is no difference in a level of a magnetic resistance between the first flange portion and the second flange portion, and the first laminated sheet and the second laminated sheet are laminated alternately by a predetermined number.

10. The motor of claim 1, wherein
the stator iron core includes a plurality of laminated sheets, and the plurality of laminated sheets includes
a first laminated sheet in which a level of the magnetic resistance of the first flange portion is lower than a level of the magnetic resistance of the second flange portion, and
a second laminated sheet in which there is no difference in a level of a magnetic resistance between the first flange portion and the second flange portion, and
the first laminated sheet and the second laminated sheet are laminated in a predetermined order.

11. The motor of claim 1, wherein
the plurality of teeth is arranged at equal intervals in the circumferential direction of the yoke,
each of the plurality of teeth has an identical outer shape as viewed in an axial direction, and
each tooth has an outer shape symmetrical with respect to a center line of the tooth in a width direction thereof, as viewed in the axial direction.

* * * * *